US011237555B1

United States Patent
Chan et al.

(10) Patent No.: US 11,237,555 B1
(45) Date of Patent: Feb. 1, 2022

(54) BACKUP CONTROL SYSTEMS AND METHODS FOR AUTONOMOUS VEHICLES

(71) Applicant: State Farm Mutual Automobile Insurance Company, Bloomington, IL (US)

(72) Inventors: Aaron Scott Chan, Bloomington, IL (US); Brian Fields, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 387 days.

(21) Appl. No.: 16/257,647

(22) Filed: Jan. 25, 2019

Related U.S. Application Data

(60) Provisional application No. 62/664,691, filed on Apr. 30, 2018, provisional application No. 62/641,034, filed on Mar. 9, 2018.

(51) Int. Cl.
  *G05D 1/00* (2006.01)
  *G01S 19/21* (2010.01)
  *B60W 50/14* (2020.01)

(52) U.S. Cl.
  CPC .......... *G05D 1/0077* (2013.01); *B60W 50/14* (2013.01); *G01S 19/21* (2013.01); *G05D 1/0061* (2013.01);
  (Continued)

(58) Field of Classification Search
  CPC .. G05D 1/0077; G05D 1/0061; G05D 1/0088; G05D 2201/0213; B60W 50/14; B60W 2050/143; G01S 19/21
  (Continued)

(56) References Cited

U.S. PATENT DOCUMENTS

| 5,448,479 A | 9/1995 | Kemner et al. |
| 7,992,134 B2 | 8/2011 | Hinchey et al. |

(Continued)

FOREIGN PATENT DOCUMENTS

WO    WO2014173976 A1 * 10/2014

OTHER PUBLICATIONS

Bordonali et al., "Shifting gears in cyber security for connected cars", Feb. 2017, McKinsey & Company, 20 pages.
(Continued)

*Primary Examiner* — Maceeh Anwari
(74) *Attorney, Agent, or Firm* — Armstrong Teasdale LLP

(57) ABSTRACT

A backup control server for reducing dangers to automation systems of autonomous vehicles includes a memory and a processor. The processor is programmed to detect an anomalous event which may include one of a geomagnetic interference event and a cyber-attack event. The processor may also be programmed to perform a threat assessment for the anomalous event relative to an automation system of a vehicle. The automation system may be configured to control an aspect of autonomous operation of the vehicle. The processor may be further programmed to determine one or more mitigating actions to perform on the automation system based upon the threat assessment. The one or more mitigating actions are configured to reduce a danger to the vehicle presented by the anomalous event. The processor may also be programmed to transmit to the vehicle instructions to perform one or more mitigating actions on the automation system.

19 Claims, 7 Drawing Sheets

(52) U.S. Cl.
CPC ..... *G05D 1/0088* (2013.01); *B60W 2050/143* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | |
|---|---|---|---|
| 9,435,659 | B1 | 9/2016 | Kozloski et al. |
| 9,697,355 | B1 | 7/2017 | Park et al. |
| 2004/0008103 | A1 | 1/2004 | Kady et al. |
| 2010/0286845 | A1 | 11/2010 | Rekow et al. |
| 2014/0309813 | A1 | 10/2014 | Ricci |
| 2016/0255154 | A1 | 9/2016 | Kim et al. |
| 2017/0013005 | A1* | 1/2017 | Galula .................... H04L 63/20 |
| 2017/0123428 | A1 | 5/2017 | Levinson et al. |
| 2017/0139411 | A1 | 5/2017 | Hartung et al. |
| 2017/0169208 | A1 | 6/2017 | Jantz et al. |
| 2018/0219878 | A1 | 8/2018 | Hirshberg et al. |
| 2018/0224851 | A1 | 8/2018 | Park |
| 2018/0234446 | A1 | 8/2018 | Conner et al. |
| 2019/0036948 | A1* | 1/2019 | Appel .................... H04L 63/20 |

OTHER PUBLICATIONS

Burgess, "Blockchain technology will help protect your autonomous car", Internet Article, Jun. 23, 2016, Wired UK, 7 pages. Accessed online at URL: http://www.wired.co.uk/article/mark-walport-chief-scientific-advisor-blockchain.

Dorri et al., "Blockchain: A Distributed Solution to Automotive Security and Privacy", 2017, IEEE Communications Magazine, vol. 55, No. 12, 8 pages, Accessed online at URL: https://www.researchgate.net/publication/315723189_BlockChain_A_Distributed_Solution_to_Automotive_Security_and_Privacy.

Shin et al., "Remote Intrusion Detection and Prevention for Connected Vehicles", MTC Research Review, May 25, 2016, University of Michigan, 26 pages.

* cited by examiner

BACKUP CONTROL SYSTEMS AND METHODS FOR AUTONOMOUS VEHICLES

CROSS-REFERENCE TO RELATED APPLICATIONS

This application relates to U.S. Provisional Patent Application No. 62/641,034, filed Mar. 9, 2018, entitled "BACKUP CONTROL SYSTEMS AND METHODS FOR AUTONOMOUS VEHICLES," and to U.S. Provisional Patent Application No. 62/664,691, filed Apr. 30, 2018, entitled "BACKUP CONTROL SYSTEMS AND METHODS FOR AUTONOMOUS VEHICLES," the entire contents and disclosure of which are hereby incorporated by reference herein in their entirety.

FIELD OF THE DISCLOSURE

The present disclosure generally relates to autonomous vehicles and, more particularly to backup control systems and methods for autonomous vehicles and associated infrastructure.

BACKGROUND

As automobiles become ever more autonomous, vehicle technology seems to indicate an ever increasing trend toward, and dependence upon, over-the-air signals (e.g., wireless communications, satellite detection) and automatic decision-making for aspects of autonomous vehicle operation. For example, some autonomous and semi-autonomous vehicles may rely upon accurate global positioning system (GPS) data to provide an accurate vehicle positioning information used in critical piloting functions. Further, as the technical field of autonomous vehicles advances, the functionality of control systems introduced with autonomous and semi-autonomous vehicles is also becoming more important to the safe operation of the vehicle.

As hardware- and software-based control systems continue to take over activities traditionally performed by human drivers, the impact of incorrect decisions made by these control systems could lead to property damage and human injury, thereby magnifying the importance of proper operation of the control systems. Reliance on communications and sensing functionality may introduce certain sensitivities and vulnerabilities to the underlying systems of the individual autonomous or semi-autonomous vehicle, the autonomous vehicle network, and thus also to traditional human-driven vehicles operating amongst such autonomous vehicles.

BRIEF SUMMARY

The present embodiments may relate to systems and methods for providing backup control to autonomous or semi-autonomous vehicles. A backup control system including a backup control computing device installed on an autonomous vehicle may detect anomalous events that present potential dangers to the various autonomous operations of the vehicle, and initiate corrective actions. Anomalous events may include geomagnetic interference events that may interfere with certain network-based communications or satellite sensor communications, and cyber-attack events that may interfere with the intended operations of the autonomous operations of the vehicle. The vehicle may detect these anomalous events locally, or may receive notification of anomalous events from a backup control server or other connected device.

In one aspect, a non-transitory computer-readable medium storing instructions may be provided. When executed by a processor of a computing device, the instructions cause the processor of a backup control computing device to perform operations including receiving an indication of an anomalous event. The anomalous event may include one of a geomagnetic interference event and a cyber-attack event. The operations may also include performing a threat assessment for the anomalous event relative to an automation system of a vehicle. The automation system may be configured to control an aspect of autonomous operation of the vehicle. The operations may further include determining one or more mitigating actions to perform on the automation system based upon the threat assessment. The one or more mitigating actions are configured to reduce a danger to the vehicle presented by the anomalous event. The operations also include performing the one or more mitigating actions on the automation system, thereby reducing danger to the vehicle presented by the anomalous event. The instructions may direct additional, less, or alternate operations or functionality, including those discussed elsewhere herein.

In another aspect, a backup control server for reducing dangers to automation systems of autonomous vehicles may be provided. The backup control server includes a memory and a processor. The processor is programmed to detect an anomalous event. The anomalous event may include one of a geomagnetic interference event and a cyber-attack event. The processor may also be programmed to perform a threat assessment for the anomalous event relative to an automation system of a vehicle. The automation system may be configured to control an aspect of autonomous operation of the vehicle. The processor may be further programmed to determine one or more mitigating actions to perform on the automation system based upon the threat assessment. The one or more mitigating actions are configured to reduce a danger to the vehicle presented by the anomalous event. The processor may also be programmed to transmit to the vehicle instructions to perform one or more mitigating actions on the automation system, thereby reducing danger to the vehicle presented by the anomalous event. The server may be configured with additional, less, or alternate functionality, including that discussed elsewhere herein.

In yet another aspect, a backup control computing device for reducing dangers to automation systems of autonomous vehicles may be provided. The backup control computing device may include a memory and a processor. The processor may be programmed to determine the occurrence of an anomalous event. The anomalous event may include one of a geomagnetic interference event and a cyber-attack event. The processor may also be programmed to perform a threat assessment for the anomalous event relative to an automation system of a vehicle. The automation system may be configured to control one aspect of autonomous operation of the vehicle. The processor may be further configured to determine one or more mitigating actions to perform on the automation system based upon the threat assessment, the one or more mitigating actions are configured to reduce a danger to the vehicle presented by the anomalous event. The processor may be also configured to perform the one or more mitigating actions on the automation system, thereby reducing danger to the vehicle presented by the anomalous event.

The device may include one or more additional, less, or alternate actions, including those discussed elsewhere herein.

In still another aspect, a computer-implemented method for reducing dangers to automation systems of autonomous vehicles may be provided. The method may be implemented using a backup control computing device including a processor and a memory. The method may include, via one or more processors, sensors, servers, or transceivers, determining the occurrence of an anomalous event. The anomalous event includes one of a geomagnetic interference event and a cyber-attack event. The method may also include performing a threat assessment for the anomalous event relative to an automation system of a vehicle. The automation system may be configured to control one aspect of autonomous operation of the vehicle. The method further may include determining one or more mitigating actions to perform on the automation system based upon the threat assessment. The one or more mitigating actions are configured to reduce a danger to the vehicle presented by the anomalous event. The method may also include performing the one or more mitigating actions on the automation system, thereby reducing danger to the vehicle presented by the anomalous event. The method may include additional, less, or alternate actions, including those discussed elsewhere herein.

In a further aspect, a backup control computing device for reducing dangers to automation systems of autonomous vehicles may be provided. The backup control computing device includes a memory and a processor. The processor is programmed to receive an indication of an anomalous event. The anomalous event may include one of a geomagnetic interference event and a cyber-attack event. The processor may also be programmed to perform a threat assessment for the anomalous event relative to an automation system of a vehicle. The automation system may be configured to control one or more aspects of autonomous operation of the vehicle. The processor may further be programmed to determine one or more mitigating actions to perform on the automation system based upon the threat assessment. The one or more mitigating actions are configured to reduce a danger to the vehicle presented by the anomalous event. The processor may also be programmed to perform the one or more mitigating actions on the automation system, thereby reducing danger to the vehicle presented by the anomalous event. The computing device and automation system may include additional, less, or alternate functionality, including that discussed elsewhere herein.

In another aspect, a computer-implemented method for reducing dangers to automation systems of autonomous vehicles may be provided. The method may be implemented using a backup control computing device including a processor and a memory. The method may include, via one or more processors, sensors, servers, or transceivers, receiving an indication of an anomalous event. The anomalous event may include one of a geomagnetic interference event and a cyber-attack event. The method may also include performing a threat assessment for the anomalous event relative to an automation system of a vehicle. The automation system may be configured to control one or more aspects of autonomous operation of the vehicle. The method may include determining one or more mitigating actions to perform on the automation system based upon the threat assessment. The one or more mitigating actions may be configured to reduce a danger to the vehicle presented by the anomalous event. The method may also include performing the one or more mitigating actions on the automation system, thereby reducing danger to the vehicle presented by the anomalous event. The method may include additional, less, or alternate actions, including those discussed elsewhere herein.

In another aspect, a non-transitory computer-readable medium storing instructions may be provided. When executed by a processor of a computing device, the instructions may cause the processor of a backup control computing device to perform operations including determining the occurrence of an anomalous event. The anomalous event includes one of a geomagnetic interference event and a cyber-attack event. The operations may also include performing a threat assessment for the anomalous event relative to an automation system of a vehicle. The automation system may be configured to control one aspect of autonomous operation of the vehicle. The operations further may include determining one or more mitigating actions to perform on the automation system based upon the threat assessment. The one or more mitigating actions are configured to reduce a danger to the vehicle presented by the anomalous event. The operations may also include performing the one or more mitigating actions on the automation system, thereby reducing danger to the vehicle presented by the anomalous event. The instructions may direct additional, less, or alternate functionality, including that discussed elsewhere herein.

In yet another aspect, a computer-implemented method of electromagnetic interference (EMI) risk mitigation may be provided. The computer-implemented method may include, via one or more processors, sensors, transceivers, and/or servers, detecting a current EMI level for a geographic location. The method may also include comparing the current EMI levels with baseline EMI data. The method further may include identifying one or more vehicle systems at risk of performance degradation based upon the geographic location and the comparing. The method may also include determining one or more risk mitigation actions for each identified vehicle system. The method further may include initiating the one or more risk mitigation actions on each identified vehicle system to reduce the risk of vehicle collision or accident. The method may include additional, less, or alternate actions, including those discussed elsewhere herein.

In still another aspect, a computer system configured to mitigate electromagnetic interference (EMI) risk to vehicles may be provided. The computer system may include one or more processors, sensors, transceivers, and/or servers configured to detect a current EMI level for a geographic location. The computer system may also be configured to compare the current EMI levels with baseline EMI data. The computer system may further be configured to identify one or more vehicle systems at risk of performance degradation based upon the geographic location and the comparing. The computer system may also be configured to determine one or more risk mitigation actions for each identified vehicle system. The computer system may further be configured to initiate the one or more risk mitigation actions on each identified vehicle system to reduce the risk of vehicle collision or accident. The computer system may include additional, less, or alternate functionality, including that discussed elsewhere herein.

In another aspect, a computer-implemented method of mitigating risk from electromagnetic interference (EMI) may be provided. The computer-implemented method may include, via one or more processors, sensors, transceivers, or servers, receiving historical data associated with EMI events affecting autonomous vehicles and associated EMI levels. The method may also include training, with the historical data, a machine learning model to identify EMI levels that negatively impact performance of autonomous vehicle systems. The method further may include receiving current EMI data for a geographic region. The method may also include applying the current EMI data into the machine learning model to identify one or more autonomous vehicle systems with performance degradation based upon the current EMI data. The method further may include identifying one or more risk mitigation actions for each identified autonomous vehicle. The method may also include automatically initiating the one or more risk mitigation actions to reduce risk from EMI. The method may include additional, less, or alternate actions, including those discussed elsewhere herein.

In another aspect, a computer system configured for EMI risk mitigation may be provided. The computer system includes one or more processors, sensors, transceivers, or servers configured to receive historical data associated with EMI events affecting autonomous vehicles and associated EMI levels. The computer system is also configured to train, with the historical data, a machine learning model to identify EMI levels that negatively impact performance of autonomous vehicle systems. The computer system is further configured to receive current EMI data for a geographic region. The computer system is also configured to apply the current EMI data into the machine learning model to identify one or more autonomous vehicle systems with performance degradation based upon the current EMI data. The computer system is further configured to identify one or more risk mitigation actions for each identified autonomous vehicle. The computer system is also configured to automatically initiate the one or more risk mitigation actions to reduce risk from EMI.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
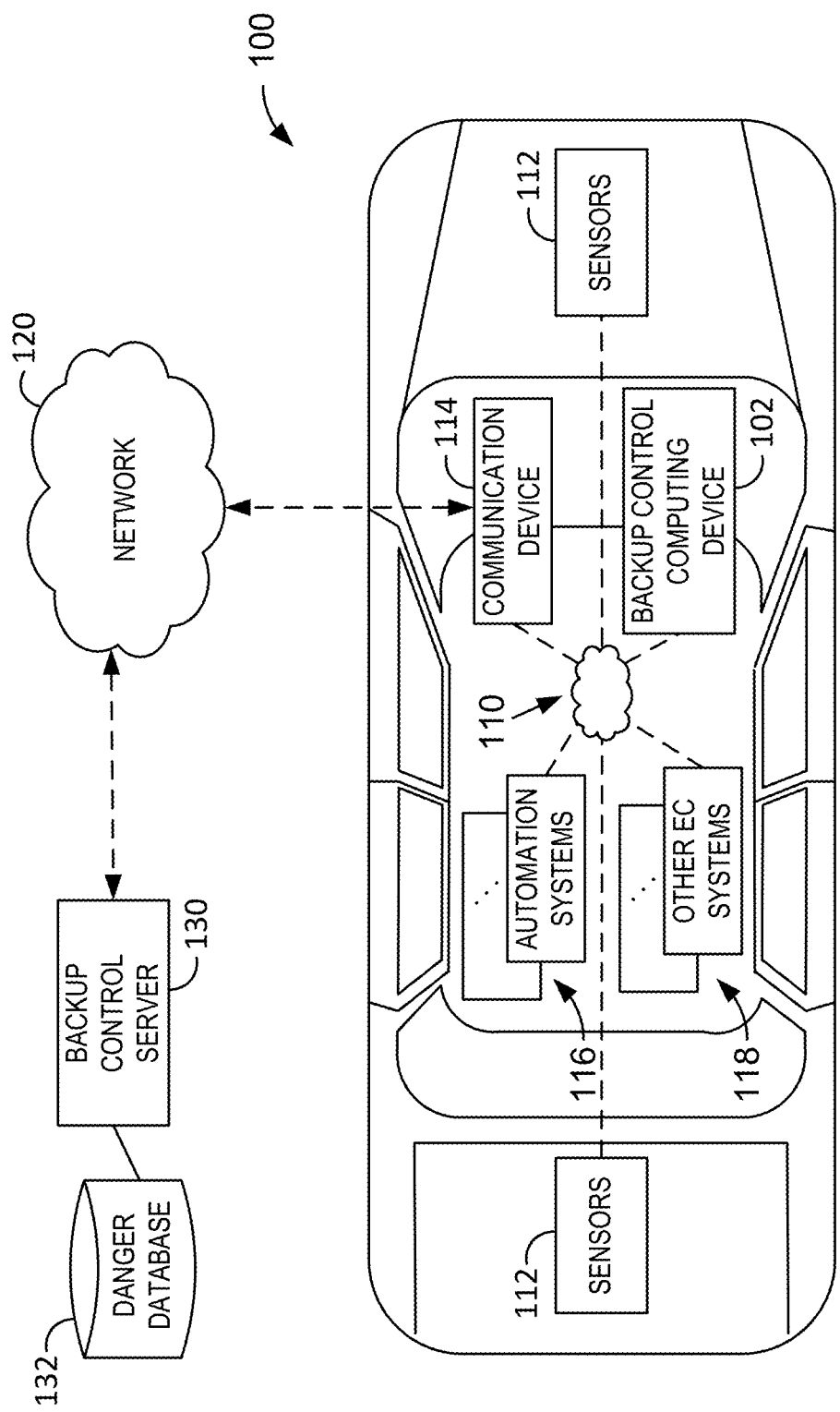
FIG. 1 illustrates a view of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods described herein relate to, inter alia, systems and methods for providing backup control associated with autonomous vehicles. As conventional consumer and commercial vehicles integrate features of robotics, mechatronics, artificial intelligence, and other computing systems that assist in operation of the vehicle ("automation systems"), these automation systems expose inherent dangers associated with their operation, and thus with the safety of the vehicle, other vehicles operating nearby, as well as the passengers of those vehicles. One potential danger to automation systems involves electromagnetic interference (EMI) (e.g., from geomagnetic storms).

For example, some automation systems may rely upon wireless communications with various wireless networks (e.g., cellular networks, satellite networks, vehicular communication networks) or with positioning systems (e.g., GPS satellites). Some such networks and positioning systems may be susceptible to various types of EMI (e.g., fluctuations or interference from solar activity, such as geomagnetic storms), and thus may pose a danger to some of the automation systems. For instance, EMI from coronal mass ejections (CME) or other sources of geomagnetic interference could disrupt the intricate network of vehicular communications and calculations to the point of creating a life-threatening error.

Another potential danger to automation systems involves cybersecurity. Due in part to the connected nature of some automation systems, such automation systems may be exposed to cybersecurity dangers. For example, hackers may seek to disrupt autonomous vehicles, individually or en masse, or their associated infrastructure (e.g., communications networks) for their own nefarious purposes. Such cyber-attacks may include, for example, denial-of-service (DoS) attacks (e.g., to inhibit communications), ransomware attacks (e.g., to disable automobiles and extort money from the owners), access attacks (e.g., for car theft), or direct-access attacks (e.g., to gain access to other onboard systems, manipulate piloting functions, and so forth).

Since certain automation systems are performing safety-critical application (e.g., piloting functions) autonomously or semi-autonomously, miscalculations or other system errors introduced by such events may create problems for those involved. As such, it would be beneficial to have a backup control system to protect against dangers imposed by electromagnetic interference or cyber-attacks.

In the exemplary embodiments, a backup control system analyzes and detects "anomalous events" associated with EMI or cybersecurity that may impact operation of automation systems for autonomous or semi-autonomous vehicles and associated infrastructure. The backup control system includes a backup control computing device (e.g., installed onboard the vehicle(s)) and a backup control server wirelessly connected to the backup control computing device. The backup control computing device may be configured to control various automation systems that provide aspects of autonomous operation for the vehicle and, more specifically, to perform mitigating actions on those automation systems of the vehicle when anomalous events are detected.

Exemplary Vehicles

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, commercial vehicles (e.g., trucking), industrial vehicles (e.g., construction vehicles), "riding" lawnmowers, planes, and/or any kind of land-, water-, or air-based vehicle.

"Vehicle user," as used herein, may refer generally to a person who is responsible for the vehicle, and who has access to use of the vehicle. Vehicle users may include owners, lessors, and/or renters, for example, of a vehicle.

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane departure systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

In some exemplary embodiments, the autonomous nature of certain autonomous vehicles and associated systems may be significant inasmuch as, for example, failure of an automation system may be a detriment to the safe operation of the vehicle. As such, stability and proper function of the automation systems that impact the piloting of the vehicle is of importance to some exemplary embodiments.

Networks

"Wireless network," as used herein, is a communications network that uses wireless data connections between network nodes. Examples of wireless networks include, for example, "cellular" or "mobile" networks (e.g., third generation (3G) wireless mobile telecommunications networks), wireless local area networks (e.g., Wi-Fi networks), "vehicular ad-hoc networks" (VANETs), and satellite networks (e.g., networks providing broadband Internet access via one or more satellites or other non-terrestrial devices, such as airplanes). Vehicular ad-hoc networks utilize wireless communications to establish inter-vehicle (e.g., vehicle-to-vehicle) or vehicle-to-roadside communications (e.g., IEEE 1609 Wireless Access in Vehicular Environments (WAVE)).

"Space-based radionavigation system," as used herein, is a navigation system in which one or more satellites or satellite-based systems provide geolocation information to receiving units ("receivers"). GPS is an example space-based radionavigation system that employs many satellites that provide geolocation information and time information to GPS receivers (e.g., anywhere on Earth that has an unobstructed line of sight to a minimum number of GPS satellites).

In some exemplary embodiments, some automation systems may utilize one or more wireless networks during performance of various automation tasks for an autonomous vehicle.

Exemplary Autonomous Vehicle Functionality

FIG. 1 depicts a view of an exemplary vehicle 100. In the exemplary embodiment, vehicle 100 is an autonomous or semi-autonomous vehicle capable of fulfilling the transportation capabilities of a traditional automobile or other vehicle. In these embodiments, vehicle 100 includes a backup control computing device 102 configured to manage aspects of autonomous vehicle operation provided by a plurality of automation systems 116, each of which represent an electronic control system onboard vehicle 100 that may be involved in some aspect of piloting vehicle 100. In some examples, danger to the safe operation of automation systems 116 and the overall safety of vehicle 100 may occur due to various environmental or human factors such as, for example, electromagnetic interference or cyber-attacks. In some embodiments, backup control computing device 102 detects dangers that may impact the safe operation of autonomous driving and reacts to such dangers by altering the operation of one or more of the automation systems 116 (e.g., disabling, gracefully shutting down, taking mitigating actions).

Vehicle 100 may include any kind of vehicle, such as, for example, cars, trucks, all-terrain vehicles (ATVs), motorcycles, recreational vehicles (RVs), snowmobiles, boats, industrial vehicles (e.g., construction vehicles), "riding" lawnmowers, smart farming equipment, ships, and so forth. Generally, vehicles 100 will be described herein using cars/trucks (e.g., personal vehicles) as examples. However, these examples should not be construed to limit the disclosure in any way, as the scope of the present disclosure may be applicable to any kind of autonomous vehicle, including those listed hereinabove. In some embodiments, vehicle 100 may include a user interface (not shown) such that vehicle users of vehicle 100 may access certain features of vehicle 100 (e.g., receive alerts from automation systems 116, backup control computing device 102, etc.).

Vehicle 100 may be capable of sensing aspects of its environment and, in some cases, assisting in or performing control aspects associated with piloting vehicle 100 (e.g., via automation systems 116, with or without human input). Vehicle 100 may include a plurality of sensors 112. The plurality of sensors 112 may detect the current surroundings and location of vehicle 100. Plurality of sensors 112 may include, but are not limited to, radar, LIDAR, GPS receivers, video devices, imaging devices, cameras, audio recorders, and computer vision.

Plurality of sensors 112 may also include sensors that detect conditions of vehicle 100, such as speed, acceleration, gear, braking, and other conditions related to the operation of vehicle 100, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. Furthermore, plurality of sensors 112 may include impact sensors that detect impacts to vehicle 100, including force and direction, and sensors that detect actions of vehicle 100, such the deployment of airbags. Plurality of sensors 112 may include sensors for detecting EMI around the vehicle (e.g., an EMI detector, an antenna).

In some embodiments, plurality of sensors 112 may detect the presence of a driver and one or more passengers (not shown) in vehicle 100. In these embodiments, plurality of sensors 112 may detect the presence of fastened seatbelts, the weight in each seat in vehicle 100, heat signatures, or any other method of detecting information about the driver and passengers in vehicle 100, including those methods of determining occupants described herein.

Automation systems 116 may interpret the sensory information from sensors 112 while performing various operations. Automation systems 116 may include, for example, (a) fully autonomous (e.g., driverless) driving; (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. While not all sensor types for each particular automation system 116 are listed here, it should be understood that sensors 112 include any sensors sufficient to allow the associated automation system 116 to operate for its intended purpose. As such, each particular automation system 116 may utilize some data from sensors 112 to perform its underlying function.

Vehicle 100 includes an onboard communications network ("onboard network") 110 that communicatively couples various electronics and computing devices on vehicle. In the exemplary embodiment, onboard network 110 includes sensors 112, automation systems 116, other electronic control (EC) systems 118, backup control computing device 102, and communications device(s) 114. In some embodiments, vehicle 100 may be able to communicate with one or more remote computer devices, such as a backup control server 130, via one or more wireless networks 120, using a communication device 114 (e.g., wireless network adapter). Network 120 may include, for example, a cellular network, a satellite network, and a wireless vehicular ad-hoc network. Vehicle 100 may include multiple communication devices 114 for connecting to multiple different types of networks. In this example, network 120 is a cellular network, perhaps also connected to the Internet (not separately shown in FIG. 1), that allows vehicle 100 to communicate with backup control server 130.

In some embodiments, backup control server 130 may include, or otherwise be connected to, a danger database 132. Danger database 132 may include such information as, for example, threat profiles, historical and current anomalous event data (e.g., solar events, weather events, EMI level data, cyber-attacks, event location data, event timing data, risk mitigation actions taken), static vehicle information (e.g., make, model, systems installed, connectivity information), dynamic vehicle information (e.g., installed software, operating system, and firmware versions, current and historical location information). In some embodiments, danger database 132 may be accessed by one or more components of vehicle 100, such as, for example, backup control computing device 102 or automation systems 116. In some embodiments, information described above in relation to danger database 132 may be stored locally on vehicle (e.g., on a memory (not shown in FIG. 1) of backup control computing device 102).

During operation, automation systems 116 operate or assist the driver in operating the associated aspects of vehicle 100. Further, backup control computing device 102 operates to monitor aspects of danger (e.g., risk) associated with such automated operations provided by automation systems 116. Some anomalous events can potentially cause a negative impact to certain automation systems 116. For example, one anomalous event that may potentially cause an impact on autonomous vehicle operation can be caused by the Earth's Sun 204 (shown in FIG. 2). A solar flare or a coronal mass ejection (CME) from the Sun 204 (shown in FIG. 2) may cause geomagnetic interference that may disrupt Earth's magnetosphere, which may cause, for example, damage or disruption to satellites, radio transmissions (e.g., wireless networks), and other terrestrial impacts (e.g., electrical power outages).

Another anomalous event that may potentially cause an impact on autonomous vehicle operation may be caused by computer security hackers ("hackers"). For example, hackers may write and deploy a computer virus that attempts to infect vehicles (e.g., for purposes of mischief, ransomware, and so forth).

When particular anomalous events occur, backup control computing device 102 may be configured to detect those anomalous events, determine that the anomalous events represent a threat, and take actions ("mitigating actions") to mitigate dangers to lives and property (e.g., to avoid accidents, reduce risk of collision). Mitigating actions may include, for example, alerting the driver of the limiting or disabling certain automation systems 116 of vehicle 100, changing vehicle 100 into a "safe mode," causing certain automation systems 116 to gracefully transition operation back to the driver, change to an alternate method of operation, or slow down and park vehicle 100. Backup control computing device 102 may evaluate the anomalous event to determine which automation systems 116 may be threatened by that anomalous event, and may determine which mitigating actions to perform based upon that threat.

In some embodiments, backup control computing device 102 may be informed of an anomalous event (e.g., by backup control server 130) or by a particular threat posed by an anomalous event. Further, in some embodiments, backup control server 130 may analyze the anomalous event to determine which automation systems 116 of vehicle 100 may be threatened, and may determine which mitigating actions are to be performed by backup control computing device 102. As such, backup control server 130 may transmit any of event information, threat information, and command instructions to backup control computing device 102 for further action.

Exemplary System

Figure 2:
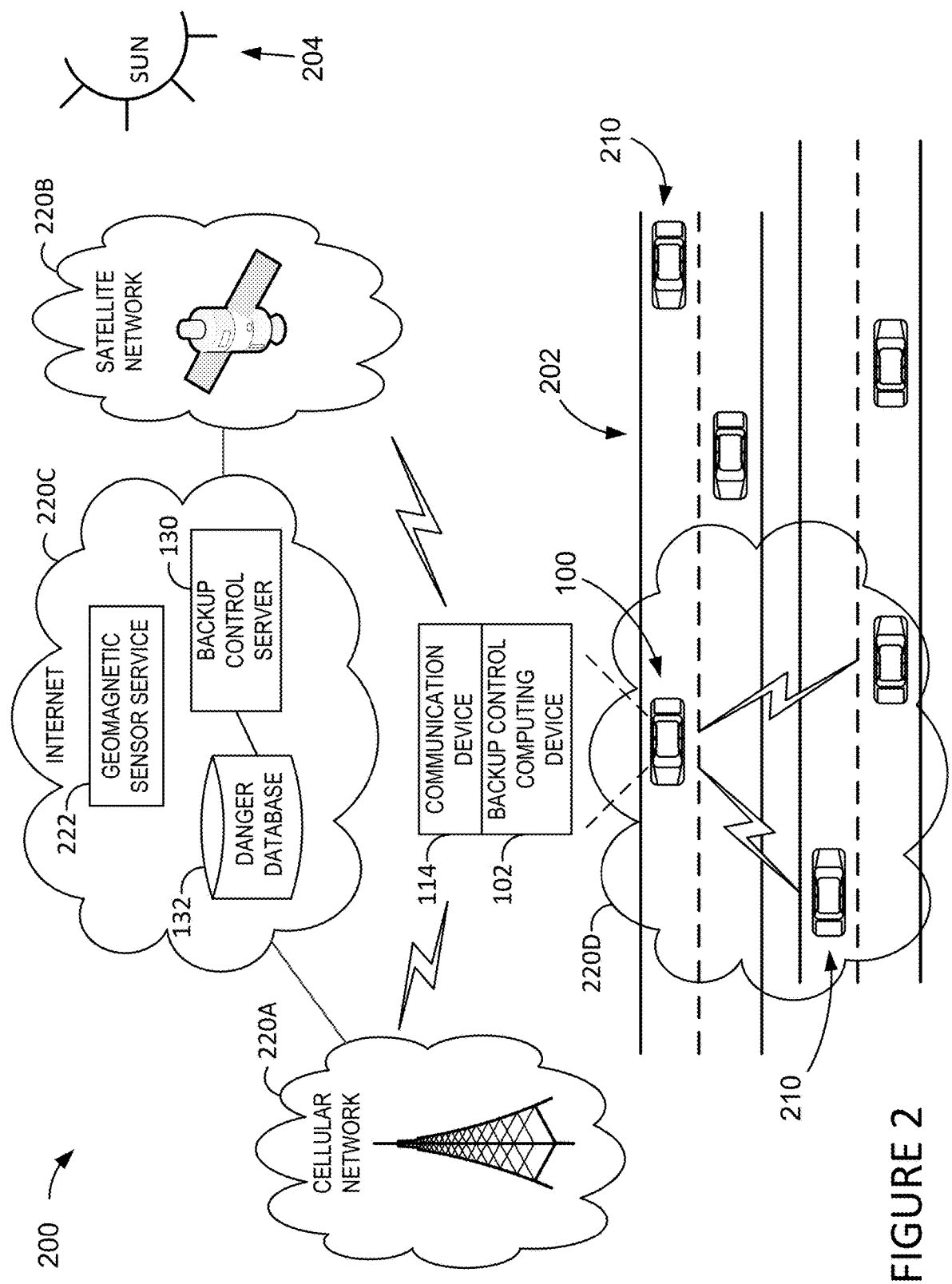
FIG. 2 illustrates an exemplary diagram of a backup control system that includes the vehicle and backup control computing device shown in FIG. 1, as well as other components.

FIG. 2 depicts an exemplary diagram of a backup control system 200 that includes the vehicle 100 and backup control computing device 102 shown in FIG. 1, as well as other components. Backup control system 200 may be configured to enable backup control computing device 102 to mitigate dangers associated with various autonomous operations of vehicle 100 based upon various anomalous events. In the exemplary embodiment, vehicle 100 travels along a four-lane divided highway 202 amongst several other vehicles 210, some or all of which may be similar to vehicle 100, some of which may be operating autonomously, semi-autonomously, or manually. Further, vehicles 100, 210 may experience some type of anomalous event that may potentially impact proper operation of one or more automation systems 116 (shown in FIG. 1) of the vehicles 100, 210.

In one exemplary embodiment, system 200 may include and/or facilitate communication between vehicle 100, one or more other vehicles 210, and backup control server 130. Vehicle 100 may be configured to communicate, via communication device 114, with one or more of a cellular network 220A, a satellite network 220B, the Internet network 220C, and a vehicle network 220D (e.g., a vehicle ad-hoc network) (collectively, "networks 220"). Networks 220 may be similar to network 120 (shown in FIG. 1). Vehicle 100 may not be directly connect with Internet 220C, but may be indirectly connected to Internet network 220C via other networks 220A, 220B, 220D. Cellular network 220A is a conventional cellular network that includes a plurality of cell towers (not separately shown) that allow vehicle 100 to transfer connection from tower to tower as vehicle 100 moves down highway 202.

Satellite network 220B may be a two-way network allowing vehicle 100 to connect and bi-directionally communicate (e.g., with Internet network 220C). For ease of illustration, satellite network 220B may also represent the network of GPS satellites that provide location and time information to GPS receiver sensors 112 (shown in FIG. 1) of vehicle 100.

Vehicle network 220D may be a vehicular ad-hoc network in which multiple vehicles may communicate (e.g., as a point-to-point wireless connection). Any of networks 220A, 220B, 220D may also be connected to the Internet network 220C, thereby facilitating access to other computing devices, services, and resources such as backup control server 130, danger database 132, and a geomagnetic sensor service 222.

In addition to vehicle 100, other vehicles 210 may also include backup control computing devices 102 that are similarly configured to perform mitigating actions for various onboard automation systems of those other vehicles 210 based upon certain anomalous events. As such, vehicles 100, 210 may represent a plurality of governed vehicles that may be controlled by or otherwise access backup control server 130 during operation. For example, a single anomalous event may be detected by backup control server 130 and disseminated to multiple vehicles 100, 210 to influence autonomous vehicle operation of those vehicles 100, 210.

Further, some anomalous events may be specific to particular geographical areas (e.g., particular locations or regions), particular makes or models of vehicle, particular automation systems, or particular firmware or software versions installed on the vehicle 100, 210. As such, backup control computing device 102 or backup control server 130 may limit reaction to certain anomalous events based upon such data. For example, a geomagnetic interference-related event may be determined to affect only a portion of the southern hemisphere, or a computer virus may only be determined to affect a particular firmware version of an automatic breaking system. As such, backup control server 130 may only transmit control actions to vehicles within the affected region of the southern hemisphere (e.g., based upon the current or anticipated GPS location of the vehicle 100, 210), or to vehicles that have the particular firmware version of the particular automatic breaking system installed, or backup control computing device 102 may only perform mitigating actions if vehicle 100 satisfies the threat profile from that particular anomaly.

As another example, a computer virus may have been released that targets autonomous steering controls systems on 2018 Ford trucks. As such, backup control server 130 may only transmit control actions to vehicles that are 2018 Ford trucks having the affected steering control system, or backup control computing device 102 may only perform mitigating actions if vehicle 100 satisfies the threat profile from that particular anomaly.

Geomagnetic Interference and Impacted Systems

Geomagnetic interference can be caused for several reasons, most notably by solar flares and coronal mass ejections from the Sun 204. These solar events often cause electromagnetic waves or geomagnetic storms that can negatively impact the Earth's magnetosphere and satellites orbiting the Earth. Further, the impacts to the Earth's magnetosphere and satellites cause disruptions to various types of wireless communications, such as networks 220. Accordingly, such geomagnetic interference events are considered anomalous events for purposes of this disclosure.

Some automation systems 116 (shown in FIG. 1) rely upon GPS positioning during normal operation. For example, to facilitate position determination, some sensors 112 (e.g., GPS receivers) (shown in FIG. 1) may wirelessly receive positioning data and time data from GPS satellites (e.g., often four or more GPS satellites). GPS location data may be used by various automation systems 116 (shown in FIG. 1) such as, for example, a navigation system (e.g., to determine where vehicle 100 is relative to a digital map, to determine which lane vehicle 100 is in) and a lane departure system (e.g., where vehicle 100 is relative to the center of a lane). As such, if such automation systems 116 (shown in FIG. 1) receive erroneous data or do not receive such data at all, that automation system 116 (shown in FIG. 1) may fail to perform properly (e.g., may cause the car to weave into another lane, turn onto at a street that is not there), possibly leading to human and property damage.

Geomagnetic interference events may impact the operation of such GPS satellites, thereby making the affected satellites unusable as a reference. If some GPS satellites are disabled by the event, then vehicle 100 may determine an inaccurate GPS location for the vehicle (e.g., using too few or less ideal satellites for the location computation), or may not be able to determine a location at all. Further, geomagnetic interference events may impact the ability of sensors 112 (shown in FIG. 1) on vehicle 100 to accurately receive data from those satellites (even if they are, themselves, operationally unaffected by the event).

Some automation systems 116 (shown in FIG. 1) rely upon wireless network-based communication to other computing devices during normal operation. For example, a navigation system may periodically download electronic maps of a region. As such, a disruption to such networked communication may cause the associated automation system to be unable to navigate due to lacking a map, to receive a corrupted map, or to rely upon a potentially-outdated map that was previously downloaded.

Geomagnetic interference events may impact the operation of wireless networks such as networks 220A, 220B, 220D. For example, geomagnetic interference in the Earth's atmosphere may disrupt (e.g., corrupt) packet-based wireless communications between a 3G cellular tower and vehicle 100, possibly limiting throughput of communications (e.g., requiring error retransmissions) or perhaps even eliminating connectivity for a period of time (e.g., for the duration of the event).

Cyber-Attacks and Impacted Systems

Cyber-attacks seem ubiquitous in all types of "connected" computing devices. As the computerization of automobiles and other vehicles progresses, vehicles have become the subject of recent cyber-attacks. To further magnify the danger, the automation of various systems within vehicles gives hackers more avenues through which they can disrupt operations. To date, cyber-attacks of vehicles have been relatively minimal. However, as vehicles become more autonomous, the trend toward vehicle-focused cyber-attacks continues to rise. Cyber-attack events may negatively impact the operational performance of some automation systems 116 (shown in FIG. 1), possibly causing potential injury to human life and property. Further, cyber-attack events may eventually be used, like the prevalent ransomware attacks on personal computing devices, to hijack, disable, and hold hostage the vehicle unless and until the user pays a ransom. Accordingly, such cyber-attack events are considered anomalous events for purposes of this disclosure.

Some cyber-attacks may be specific to certain computing devices and systems. Typically, hackers study, test, and probe specific software, firmware, or operating systems for security vulnerabilities. Security vulnerabilities represent weaknesses in the computing device through which the hacker can cause mischief. These security vulnerabilities may present avenues of attack that allow the hacker to execute their own code, steal data, disable systems, or otherwise gain unprivileged access to the computing device or system. In the context of autonomous vehicles, cyber-attack events present the additional danger of mischievous meddling with automation systems 116 (shown in FIG. 1) that may negatively affect the piloting of the vehicle. For example, with access to an autonomous steering system of vehicle 100, the hacker may cause vehicle 100 to swerve at random times, thereby potentially causing an accident, or the hacker may cause vehicle 100 to drive to a destination of their choosing, thereby potentially stealing vehicle 100 or kidnapping its occupants.

Some cyber-attack events may involve a hacker targeting a specific vehicle, such as vehicle 100, with malicious software ("malware"). Other cyber-attack events may involve malware which can self-replicate on the computing systems of the vehicle (e.g., a computer virus) and continue to infect the vehicle, even when removed from one detected location. Other cyber-attack events may involve malware that can spread itself (e.g., a computer worm) to infect other computing devices or systems (e.g., through networks 220). For example, a hacker may create and deploy a worm on one vehicle and that worm may replicate itself onto another vehicle whenever the two vehicles share data or files, thereby exposing both vehicles to whatever malicious effects the worm contains.

Anomalous Event Detection and Response

To mitigate danger against such anomalous events, in the exemplary embodiment, the backup control system 200 detects anomalous events that may pose a threat to autonomous vehicles such as vehicle 100, performs a threat assessment based upon the anomalous events, and performs mitigating actions to help avoid potential failures that may result from those events.

Regarding geomagnetic interference events, the backup control system 200 may detect upcoming or currently-occurring events in several ways. In some embodiments, the backup control system 200 may include a geomagnetic sensor service 222 (e.g., a solar flare warning system) that may be configured to detect geomagnetic interference events. Solar flares are currently difficult to predict. Further, the first stage of radiation received from a solar flare includes radiation that is traveling at the speed of light. As such, by the time a solar flare is visible, the first stage of radiation is already hitting Earth. However, geomagnetic sensor service 222 may detect that a solar flare event has occurred (e.g., is currently underway), and may thus transmit alerts indicating such.

In addition, solar flares are sometimes followed by coronal mass ejections, which generate a burst of charged particles that can take typically from one to three days to travel from the Sun 204 to the Earth. As such, geomagnetic sensor service 222 may provide advanced warning for CMEs, including estimated timeframes, estimated strengths (e.g., G1 (lowest) to G5 (highest)), and estimated affected locations. Geomagnetic sensor service 222 may transmit alerts and event details in response to detection of certain events. For example, geomagnetic sensor service 222 may determine a potential impact area or potentially impacted services (e.g., communications satellites, ground power infrastructure) based upon the estimated strength of a CME.

In some embodiments, geomagnetic sensor service 222 transmits geomagnetic event alerts to backup control server 130 and backup control server 130 performs a threat assessment based upon the event details (e.g., analyzes event details to determine whether the event warrants performing mitigating action by one or more vehicles 100, 210). Threat assessment may include identifying which vehicles 100, 210 are likely to be impacted (e.g., based upon current location and use of vehicle, historical use of vehicle, estimated affected region, estimated strength of event, estimated impacted systems), and may include transmitting mitigating actions commands to only those vehicles 100, 210 that are at sufficient danger from the event. In other embodiments, backup control server 130 may relay the event information to individual vehicles 100, 210, and those vehicles 100, 210 may perform a threat assessment locally (e.g., determining whether their own systems are in danger).

In some embodiments, vehicle 100 infers the occurrence of a geomagnetic interference event based upon local data (e.g., data gathered from sensors 112, shown in FIG. 1, or other computing devices onboard vehicle 100). For example, during a strong solar flare, some wireless communications may become disabled (e.g., before geomagnetic sensor service 222 can detect and transmit alerts through to vehicle 100). Backup control computing device 102 may detect, for example, a loss of communication to cellular network 220A, or a loss of reception from one or more GPS satellites. As such, backup control computing device 102 may determine, based upon such communications interruptions, that a geomagnetic interference event has occurred, and may thus perform a threat assessment and execute one or more mitigating actions based upon the event.

In some embodiments, a geomagnetic interference event may be determined based upon a correlation of multiple local detections. For example, presume that vehicles 210 each experienced a geomagnetic interference event that disabled GPS reception, and each vehicle 210 independently determined that a geomagnetic interference event had occurred. Further presume that vehicle 100 has not yet made a local determination that a geomagnetic interference event is taking place, but that vehicle 100 has lost connectivity to cellular network 220A, and thus cannot receive an event notification from geomagnetic sensor service 222. However, vehicle 100 may be connected to one or more vehicles 210 nearby and, as such, backup control computing device 102 may receive, from the other vehicles 210, an indication that those vehicles 210 have experienced a locally-determined geomagnetic interference event. As such, backup control computing device 102 may determine, from the reported events of other vehicles 210, that a geomagnetic interference event has occurred.

Regarding cyber-attack events, the backup control system 200 may detect potential or currently-occurring events in several ways. In some embodiments, the backup control system 200 may receive indications of current or recent cyber-attack events that have happened on other vehicles 210 and may infer, based upon that event information, that vehicle 100 is in danger of a similar cyber-attack. In some embodiments, backup control system 200 (e.g., backup control server 130, backup control computing device 102) may evaluate potential danger to vehicle 100 becoming affected by the cyber-attack based upon a current proximity to other vehicles 210 that have been affected (e.g., infected).

In some embodiments, backup control computing device 102 may receive a cyber-attack event notification from a nearby vehicle 210 (e.g., via networks 220A, 220D) indicating that, for example, the particular transmitting vehicle has experienced a cyber-attack event, that the particular transmitting vehicle has recently passed another vehicle 210 that indicated it had experienced a cyber-attack event, or that the particular transmitting vehicle has recently performed response actions directed at preventing a cyber-attack. Upon such determinations, backup control computing device 102 may initiate response actions directed at preventing the cyber-attack.

In some embodiments, backup control computing device 102 may detect the occurrence of a cyber-attack event within vehicle 100.

In some embodiments, cyber-attack event information may be sent to vehicle 100 (e.g., from backup control server 130, danger database 132, other vehicles 210). Cyber-attack event information may include, for example, an event identifier (e.g., distinguishing multiple cyber-attack events) and cyber-attack profile information associated with the event (e.g., which vehicle make, model, automation system or versions are affected). Cyber-attack event information may be used by backup control computing device 102 to perform a threat assessment related to the cyber-attack and determine mitigating actions for automation systems 116 (shown in FIG. 1) based upon the nature of the cyber-attack.

Based upon the particular anomalous event and various associated event data, a threat assessment may be performed (e.g., by backup control server 130, by backup control computing device 102). In some embodiments, threat assessment may include determining one or more automation systems 116 (shown in FIG. 1) that are in danger, determining a severity of the detected anomalous event, and determining a set of mitigating actions to be taken based upon the determined severity. In some embodiments, threat assessment may include determining current EMI activity or an EMI level for a particular geographic area (e.g., a current geographic region of vehicle 100). In some embodiments, threat assessment may include comparing a detected EMI level with one or more of a baseline EMI level and historical EMI data. If, for example, the detected EMI level is above the baseline EMI level (e.g., a pre-determined threshold), or if the detected EMI level is above historical EMI levels (e.g., in the top $20^{th}$ percentile based upon the historical EMI levels), then the backup control computing device 102 may initiate the determined set of mitigating actions based upon the detected EMI level. The mitigating actions may be configured to, for example, reduce the risk of vehicle collision or other types of vehicular accidents.

Determining which automation systems 116 (shown in FIG. 1) are in danger may be determined relative to the type of anomalous event and the typical impacts of that type of anomalous event relative to each particular type of automation system 116 (shown in FIG. 1). For example, automation systems 116 (shown in FIG. 1) that rely upon wireless communication and GPS (e.g., navigation systems) may be susceptible to geomagnetic interference events. Automation systems 116 (shown in FIG. 1) that are susceptible to cyber-attack events include, for example, automation systems 116 (shown in FIG. 1) that are configured to accept firmware updates from remote sources and automation systems 116 (shown in FIG. 1) that receive files from remote sources.

Determining a severity of the detected anomalous event may include generating an event score based upon various factors. Factors may include, for example, a likelihood of the anomalous event impacting vehicle 100 or a particular automation system 116 (shown in FIG. 1), an amount of use of the particular automation system 116 (shown in FIG. 1) likely to be impacted (e.g., how frequently automation system 116, shown in FIG. 1, is used by the driver or by vehicle 100 during normal operation), and a level of criticality of the particular automation system 116 (shown in FIG. 1) most likely to be impacted (e.g., higher value for systems that directly control steering functionality, lower value for systems that only provide warnings). Some factors may differ based upon, for example, the type of anomalous event and the type of automation system that may be impacted. For example, factors for a geomagnetic interference event may include a type of geomagnetic interference event (e.g., solar flare, CME), an estimated strength of the event, and an estimated geographical region of effect.

Factors for a cyber-attack event may include an impact level of the particular cyber-attack (e.g., a lower score for irritation attacks, a higher score for attacks impacting usability of the systems), a difficulty level associated with removing associated malware (e.g., a lower score for malware that is easily erased, a higher score for self-replicating viruses), and whether the malware can spread itself (e.g., worms).

As a part of a threat assessment for an anomalous event, one or more mitigating actions may be determined (e.g., by backup control server 130, by backup control computing device 102). While the specific commands used to perform certain mitigating actions may be device-dependent (e.g., based upon the type, vendor, firmware version of automation system 116, shown in FIG. 1), some mitigating actions may be framed generically.

Some mitigating actions may include alerting the driver. Alerting the driver may include, for example, providing a warning message on a display device (not shown) of vehicle 100, playing an audible alert using a speaker device (not shown) of vehicle 100, or illuminating a signal (e.g., on a dashboard of vehicle 100 or otherwise near the driver).

Some mitigating actions may include enabling a "safe mode" for vehicle 100 or the associated automation system 116 (shown in FIG. 1). Enabling "safe mode" may be vehicle- or system-dependent. For example, a "safe mode" for some systems may include turning over functionality to the driver in an orchestrated manner, or limiting operation of the system in some manner (e.g., reducing a cruise control system to a maximum speed, increasing a separation distance between vehicle 100 and a vehicle in front of vehicle 100).

Some mitigating actions may include disabling the associated automation system 116 (shown in FIG. 1).

In some embodiments, determining a severity may include determining a level of severity from a tiered set of severity levels. For example, a set of severity levels and associated response actions may include "low" (e.g., "take no action"), "medium" (e.g., "alert driver"), "high" (e.g., "disable or gracefully shut down the at-risk automation systems 116, turn over duty to driver"), or "emergency" (e.g., "immediately slow down and park vehicle").

In some embodiments, vehicle 100 may be insured by an insurance provider (not shown). The insurance provider may provide an insurance discount (e.g., a pre-determined percentage discount, a flat fee discount) if vehicle 100 is configured to support the backup control systems and methods described herein (e.g., if vehicle 100 includes backup control computing device 102, if backup control computing device 102 is operational for a given period of time). Backup control server 130 may collect backup control verification data from vehicle 100 (e.g., periodically) to, for example, verify whether vehicle 100 includes backup control computing device 102, whether and when backup control computing device 102 was operational, and so forth. Such backup control verification data may be used by the insurance provider to verify eligibility for the discount.

Exemplary User Computer Device

Figure 3:
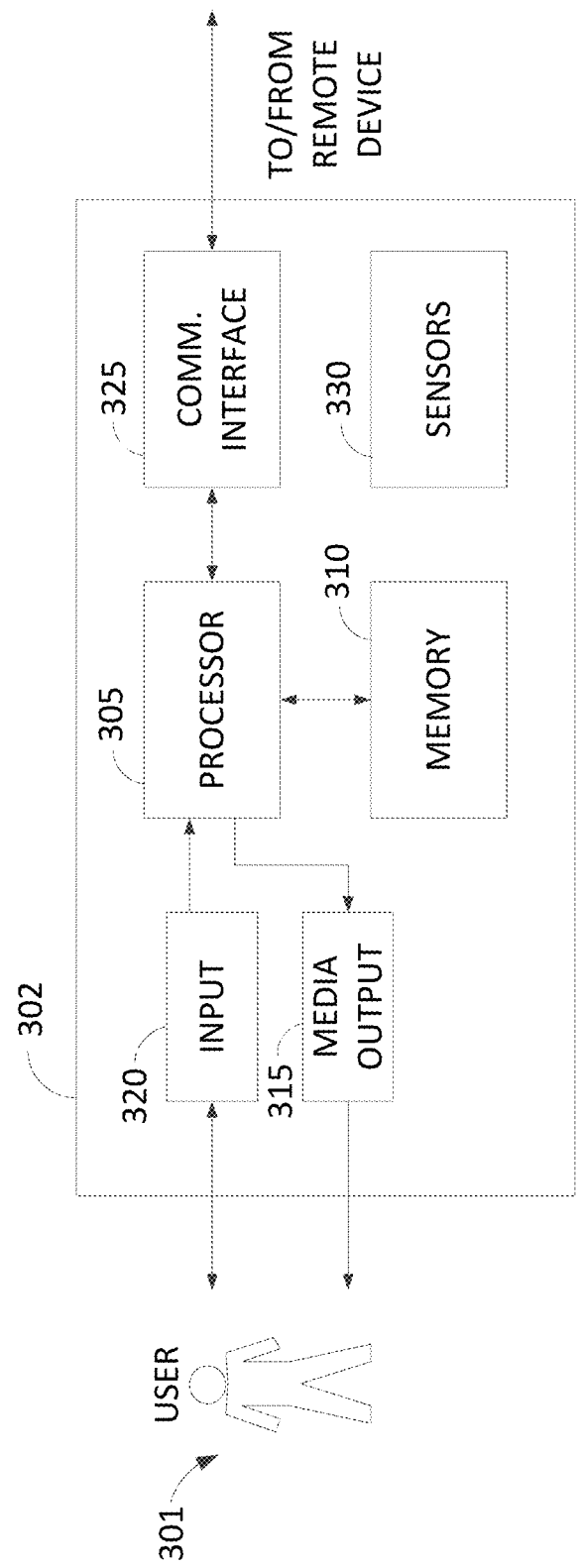
FIG. 3 illustrates an exemplary configuration of an exemplary vehicle computer device that may be used with the vehicle shown in FIG. 1 and the backup control system shown in FIG. 2.

FIG. 3 depicts an exemplary configuration of an exemplary vehicle computer device 302 that may be used with vehicle 100 (shown in FIG. 1) and backup control system 200 (shown in FIG. 2), in accordance with one embodiment of the present disclosure. Vehicle computer device 302 may be operated by a user 301 (e.g., a vehicle user). Vehicle computer device 302 may include, but is not limited to, backup control computing device 102, communication device 114, and automation systems 116 (all shown in FIG. 1). Vehicle computer device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer-readable media.

Vehicle computer device 302 also may include at least one media output component 315 for presenting information to user 301. Media output component 315 may be any component capable of conveying information to user 301. In some embodiments, media output component 315 may include an output adapter (not shown), such as a video adapter and/or an audio adapter. An output adapter may be operatively coupled to processor 305 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, an online store interface for viewing and/or purchasing items, and/or a wallet application for managing payment information.

In some embodiments, vehicle computer device 302 may include an input device 320 for receiving input from user 301. User 301 may use input device 320 to, without limitation, interact with vehicle 100 (e.g., using an app), backup control computing device 102, or backup control server 130 (all shown in FIG. 1). Input device 320 may include, for example, a keyboard, a pointing device, a mouse, a stylus, and/or a touch sensitive panel (e.g., a touch pad or a touch screen). A single component, such as a touch screen, may function as both an output device of media output component 315 and input device 320. Vehicle computer device 302 further includes at least one sensor 330, including, for example, a gyroscope, an accelerometer, a position detector, a biometric input device, a telematics data collection device, and/or an audio input device.

Vehicle computer device 302 may also include a communication interface 325, communicatively coupled to a remote device such as backup control mitigation server 130 (shown in FIG. 1) and/or backup control computing devices 102 of other vehicle 210 (both shown in FIG. 2). Communication interface 325 may include, for example, a wired or wireless network adapter and/or a wireless data transceiver for use with a mobile telecommunications network or with onboard network 110 (shown in FIG. 1).

Stored in memory area 310 may be, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from backup control computing device 102 (shown in FIG. 1) and/or vehicle computer device 302. A client application may allow user 301 to interact with, for example, backup control computing device 102 and backup control server 130 (both shown in FIG. 1). For example, instructions may be stored by a cloud service and the output of the execution of the instructions sent to the media output component 315.

Exemplary Server Device

Figure 4:
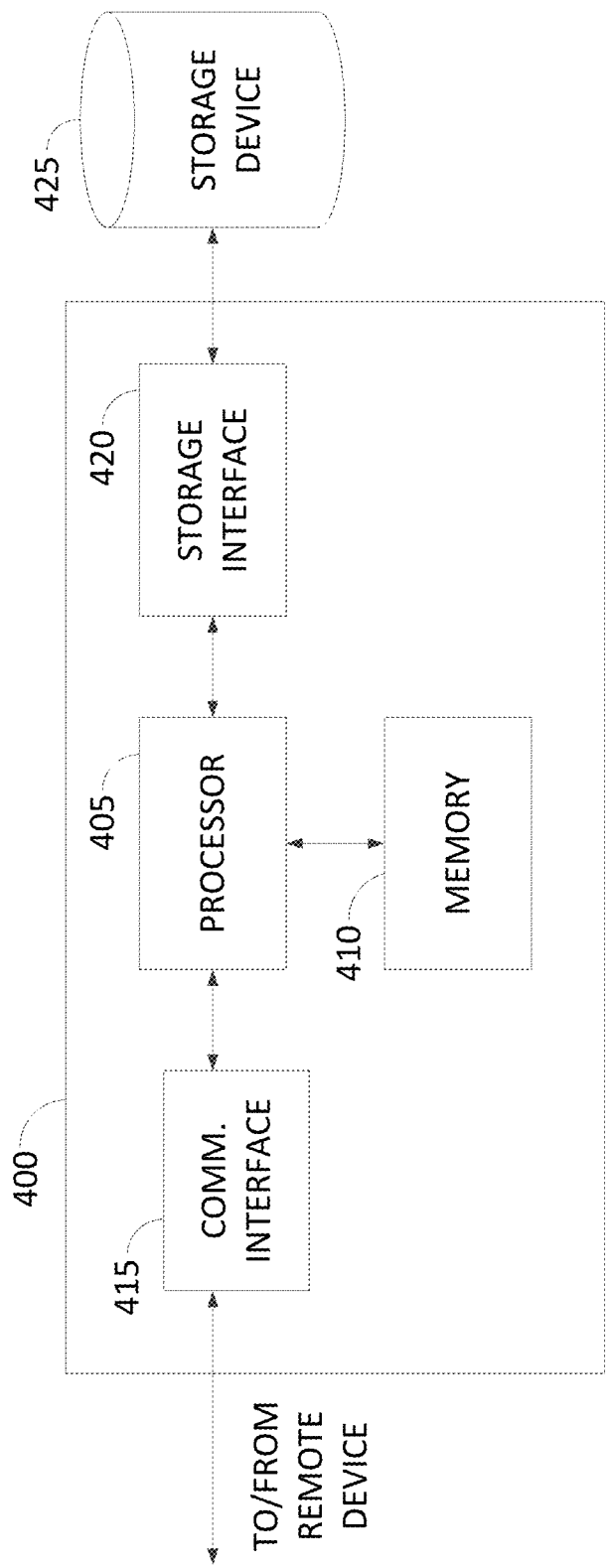
FIG. 4 illustrates an exemplary configuration of an exemplary server computing device.

FIG. 4 depicts an exemplary configuration of an exemplary server computing device 400, in accordance with one embodiment of the present disclosure. Server computer device 400 may include, but is not limited to, backup control server 130 and geomagnetic sensor service 222 (both shown in FIG. 2). Server computer device 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 400 may be capable of communicating with a remote device such as another server computer device 400, vehicle computer device 302 (shown in FIG. 3), or vehicle 100 (shown in FIG. 1). For example, communication interface 415 may receive requests from or transmit requests to vehicle computer device 302 (shown in FIG. 3) via the Internet.

Processor 405 may also be operatively coupled to a storage device 420. Storage device 420 may be any computer-operated hardware suitable for storing and/or retrieving data, such as, but not limited to, data associated with database 132 (shown in FIG. 1). In some embodiments, storage device 420 may be integrated in server computer device 400. For example, server computer device 400 may include one or more hard disk drives as storage device 420. In other embodiments, storage device 420 may be external to server computer device 400 and may be accessed by a plurality of server computer devices 400. For example, storage device 420 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 420 via a storage interface 425. Storage interface 425 may be any component capable of providing processor 405 with access to storage device 420. Storage interface 425 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 420.

Processor 405 executes computer-executable instructions for implementing aspects of the disclosure. In some embodiments, processor 405 may be transformed into a special purpose microprocessor by executing computer-executable instructions or by otherwise being programmed. For example, processor 405 may be programmed with the instructions such as are illustrated in FIG. 5.

Figure 5:
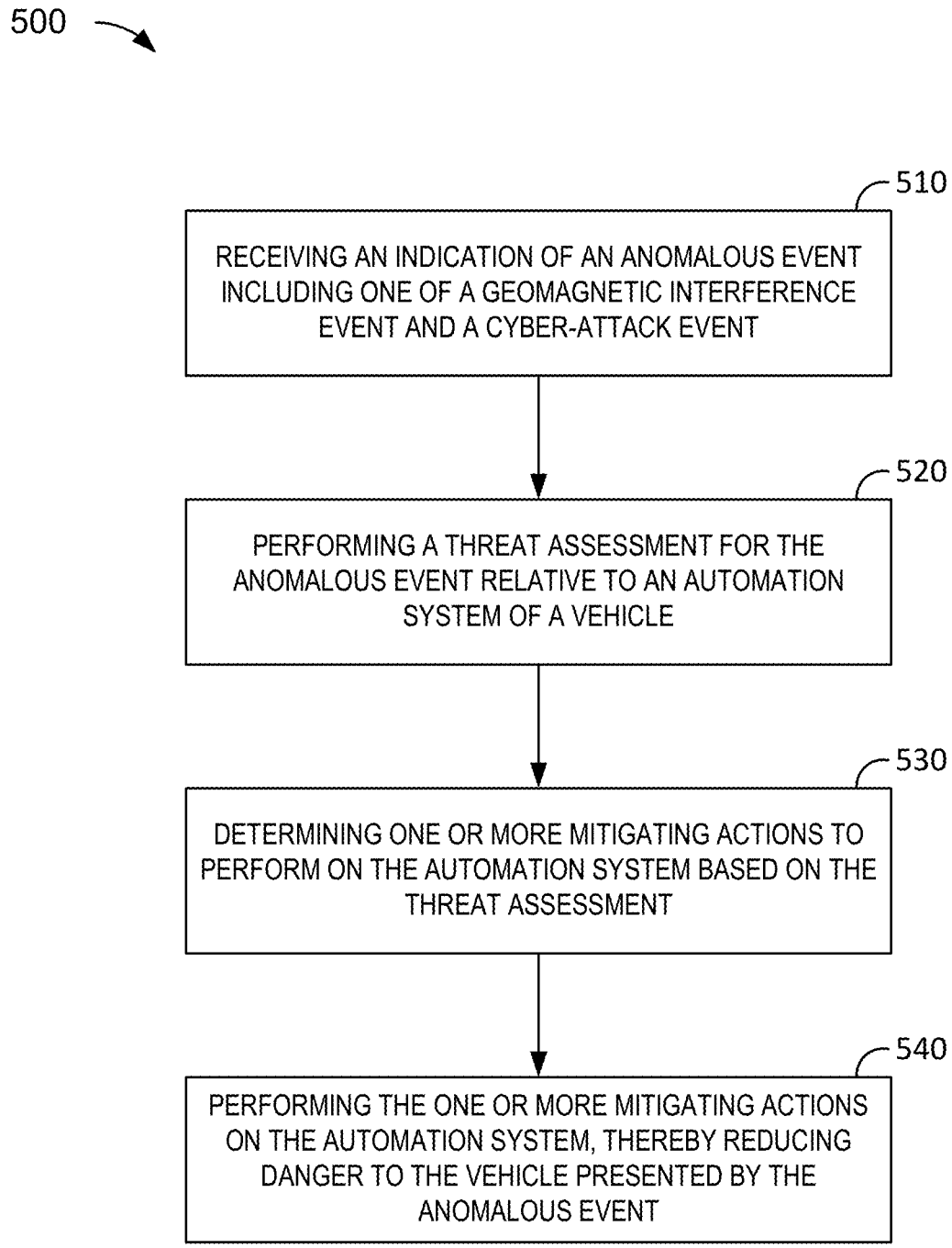
FIG. 5 illustrates a flow chart of an exemplary computer-implemented method for reducing dangers to automation systems of autonomous vehicles shown in FIG. 1.

Exemplary Computer-Implemented Method for Reducing Dangers to Automation Systems of Autonomous Vehicles FIG. 5 depicts a flow chart of an exemplary computer-implemented method 500 for reducing dangers to automation systems 116 of autonomous vehicles 100, both shown in FIG. 1. In the exemplary embodiment, method 500 may be performed by backup control computing device 102 (shown in FIG. 1).

Method 500 may include receiving an indication of an anomalous event 510. The anomalous event may include one of a geomagnetic interference event and a cyber-attack event. Method 500 may also include performing a threat assessment for the anomalous event relative to an automation system of a vehicle 520. The automation system may be configured to control an aspect of autonomous operation of the vehicle. Method 500 may further include determining one or more mitigating actions to perform on the automation system based upon the threat assessment 530. The one or more mitigating actions may be configured to reduce a danger to the vehicle presented by the anomalous event. Method 500 may also include performing the one or more mitigating actions on the automation system, thereby reducing danger to the vehicle presented by the anomalous event 540.

In some embodiments, performing the threat assessment for the anomalous event may include identifying the automation system from a plurality of automation systems based upon factors associated with the anomalous event. In some embodiments, performing the threat assessment for the anomalous event may include generating an event score for the anomalous event based upon one or more of a type of the anomalous event and a likelihood of the anomalous event impacting one or more of the vehicle the automation system. In some embodiments, the backup controller computing device may further include one or more sensor devices, the anomalous event may be a geomagnetic interference event, and receiving an indication of an anomalous event may include detecting an anomalous event based upon data received from the one or more sensors. In some embodiments, the one or more sensors include a global positioning system (GPS) receiver, and detecting an anomalous event may further include determining that communication to a particular GPS satellite has been lost.

In some embodiments, the one or more mitigating actions includes causing an alert message to be presented to a driver of the vehicle. In some embodiments, the one or more mitigating actions may include transitioning a piloting activity from the automation system to a driver of the vehicle. In some embodiments, the one or more mitigating actions may include disabling the automation system. Additionally or alternatively, in some embodiments, the one or more mitigating actions may include causing the vehicle to decelerate and park.

In some embodiments, receiving an indication of an anomalous event includes receiving an alert message from a geomagnetic sensor service indicating the geomagnetic interference event, the geomagnetic interference event is caused by one of a solar flare and a coronal mass ejection. In some embodiments, the anomalous event is the cyber-attack event, wherein receiving the indication of the anomalous event includes receiving an indication of a cyber-attack having occurred on another vehicle. In some embodiments, receiving the indication of the anomalous event includes receiving the indication of the anomalous event from another vehicle via a vehicular wireless ad-hoc network.

Exemplary Mitigation Embodiments

In one aspect, the present embodiments relate to, inter alia, mitigation systems and methods for mitigating potential issues with connected and/or autonomous vehicles during geomagnetic storms. The present embodiments may mitigate risks associated with a geomagnetic storm and/or hacking. The present embodiments may shut down or limit functionality to protect autonomous driving systems or V2V systems, and/or block hacks or limit the impact of hacks.

Since vehicle technology trends indicate ever increasing dependence on over-the-air communications and automatic decision-making for critical piloting functions (i.e., vehicle connectivity and automation), there remains sensitivities and vulnerabilities to the accurate flow of data/signal from a multitude of sources—other vehicles, satellites, roadside equipment, onboard computing systems, etc.

The functions that these interdependent systems control are also of ever-increasing importance. With self-driving functions being taken over by the hardware/software, the impact of incorrect decisions could lead to property damage, injuries or even fatalities.

These systems may be susceptible to fluctuations or interference from extra-terrestrial EMI sources and events, such as solar activity, cosmic noise, and radio stars, or from terrestrial EMI sources and events, such as atmospheric thunderstorms, lightning discharges, and precipitation static. Such EMI could disrupt the intricate network of vehicular communications and calculations to the point of creating a life-altering error. Since highly connected and automated vehicles may be performing safety-critical piloting functions largely-autonomously, even the slightest miscalculation could create problems for those involved. Slight disruptions to these systems from geomagnetic or solar activity may impose significant dangers. As such, it is beneficial to have systems that improve safety and mitigate potential losses.

The present embodiments may be configured to detect anomalous activity in the Earth's magnetic field, a geomagnetic storm, or other EMI disturbance that could affect the proper operation of connected or automated vehicle systems (or at least one vehicle in the network). For instance, anomalous activity may be detected or sensed through at least one sensor from within the network of connected vehicles, roadside equipment, onboard vehicle computing systems, off-site network servers or processing devices, global-positioning satellites, mobile devices, or other internet-enabled equipment not even involved in transportation.

The present embodiments may be configured to (i) determine or sense that electromagnetic activity (including but not limited to visible light, radio waves, cosmic radiation, gamma radiation, etc.) is above a certain threshold, and/or (ii) determine through software algorithms that the characteristics of electromagnetic activity is beyond the characteristics of normal activity.

In some embodiments, information may be received from external data sources, including but not limited to aerospace equipment, telescopes, or other sensors monitoring solar or non-terrestrial sources of electromagnetic radiation, solar flare activity, or coronal mass ejections (CME) (e.g., geomagnetic sensor service 222 shown in FIG. 2).

The present embodiments may be configured to determine that the electromagnetic activity could pose a disruption to the connected vehicle network, individual vehicles, types of vehicles, versions of vehicle software, geographic regions, types of calculations, types of communications, etc.

The present embodiments may be configured to compare a current geomagnetic storm to historical geomagnetic storms and known problems that occurred as a result. Comparing the current geomagnetic storm to known issues with vehicle or network hardware/software may also be performed.

The present embodiments may be configured to predict a potential affected area. For example, should non-terrestrial electromagnetic activity affect the planet, atmosphere or orbiting GPS satellites, an affected area may be determined based upon the predicted timing of solar activity (e.g., based upon the Earth's calculated rotational disposition at the predicted arrival time of a CME). In some embodiments, an affected area may be determined based upon terrestrial sources of EMI. For example, weather data may be used to identify geographic areas that may experience lightning discharges or atmospheric thunderstorms. Warning messages may be issued to the predicted affected areas through the vehicle network, other central authorities or mobile device networks. Also, safe shutdown procedures may be issued for one or more autonomous vehicle functionalities (e.g., safety-critical piloting or driving functions).

Figure 6:
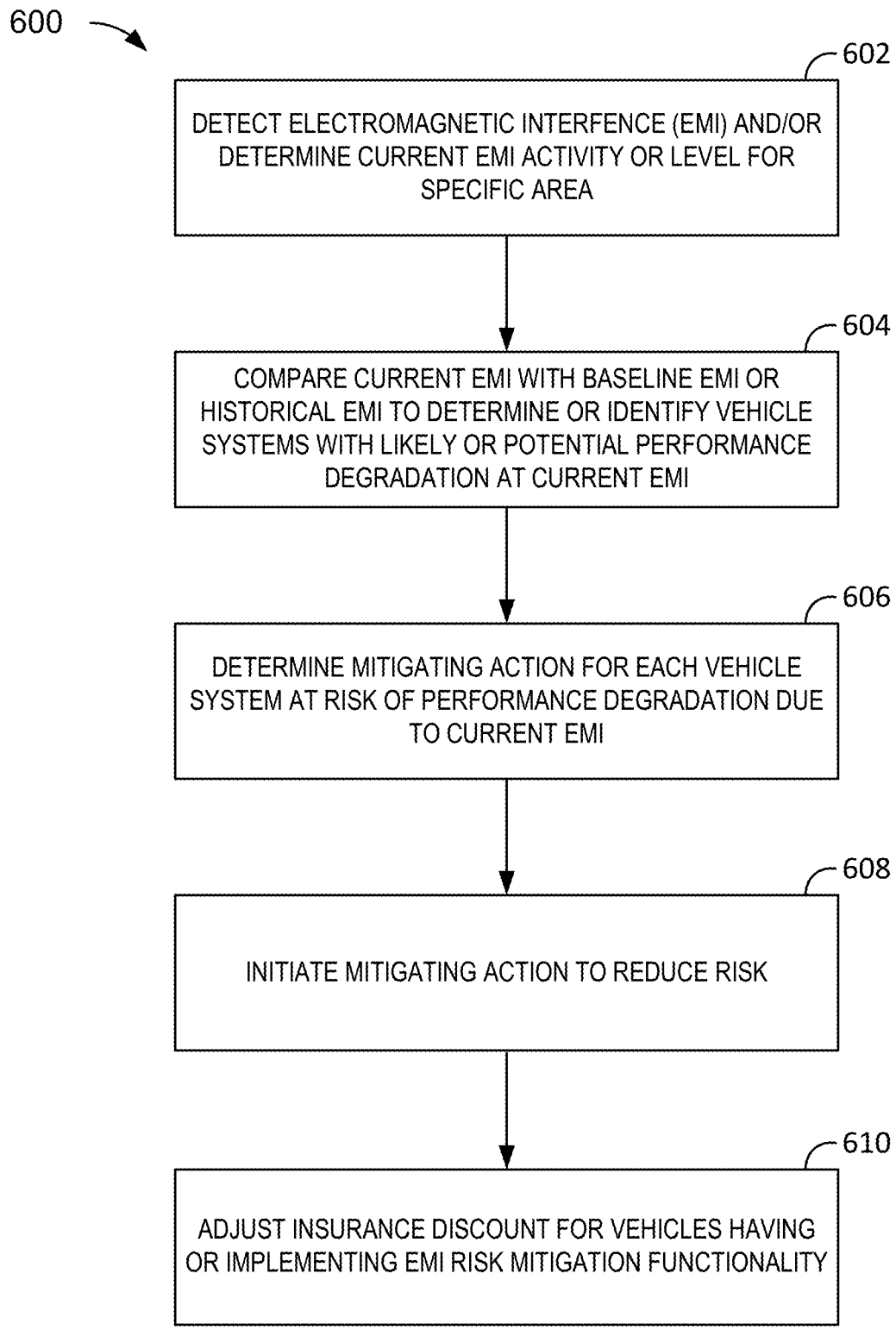
FIG. 6 illustrates an exemplary computer-implemented method of EMI risk mitigation.

FIG. 6 illustrates an exemplary computer-implemented method of EMI risk mitigation 600. The computer-implemented method 600 may include, via one or more processors, sensors, transceivers, and/or servers: (1) detecting electromagnetic interference (EMI), and/or determining current EMI activity or level(s) for a specific area, such as a city 602; (2) comparing the current EMI activity or level(s) with baseline EMI data or historical EMI data to determine or identify vehicle systems (such as autonomous or semi-autonomous vehicle systems, or other systems discussed elsewhere herein) with likely or potential performance degradation at the current EMI activity or level(s) 604; (3) determining one or more risk mitigation actions for each vehicle system at risk of performance degradation due to the current EMI 606; and/or (4) initiating risk mitigation action to reduce the risk of vehicle collision or accident 608. In some embodiments, (1) detecting EMI includes detecting a current EMI level for a geographic location, (2) comparing includes comparing the current EMI levels with baseline EMI data and identifying one or more vehicle systems at risk of performance degradation based upon the geographic location and the comparing, (3) determining one or more risk mitigation actions includes determining based upon the geographic location and the comparing, and (4) initiating includes identifying the one or more risk mitigation actions on each identified vehicle system.

The method 600 may also include adjusting an insurance discount for vehicles equipped with, or capable of implementing, the EMI risk mitigation functionality 610. In some embodiments, adjusting may include adjusting an insurance discount for drivers having vehicles that are configured to initiate the one or more risk mitigation actions. In some embodiments, risk mitigation actions may include, generating warnings to vehicles or vehicle operators, generating a visual alert to an operator of the vehicle, disabling or limiting autonomous or semi-autonomous vehicle functionality until EMI activity subsides, restricting operation of an aspect of autonomous operation until EMI activity subsides, causing the vehicle to pull over to the side of the road and park, moving or directing the vehicle to a safe parking spot, transferring vehicle control back over to a human passenger, or other risk mitigation actions, including those discussed elsewhere herein. The method may include additional, less, or alternate actions, including those discussed elsewhere herein.

Figure 7:
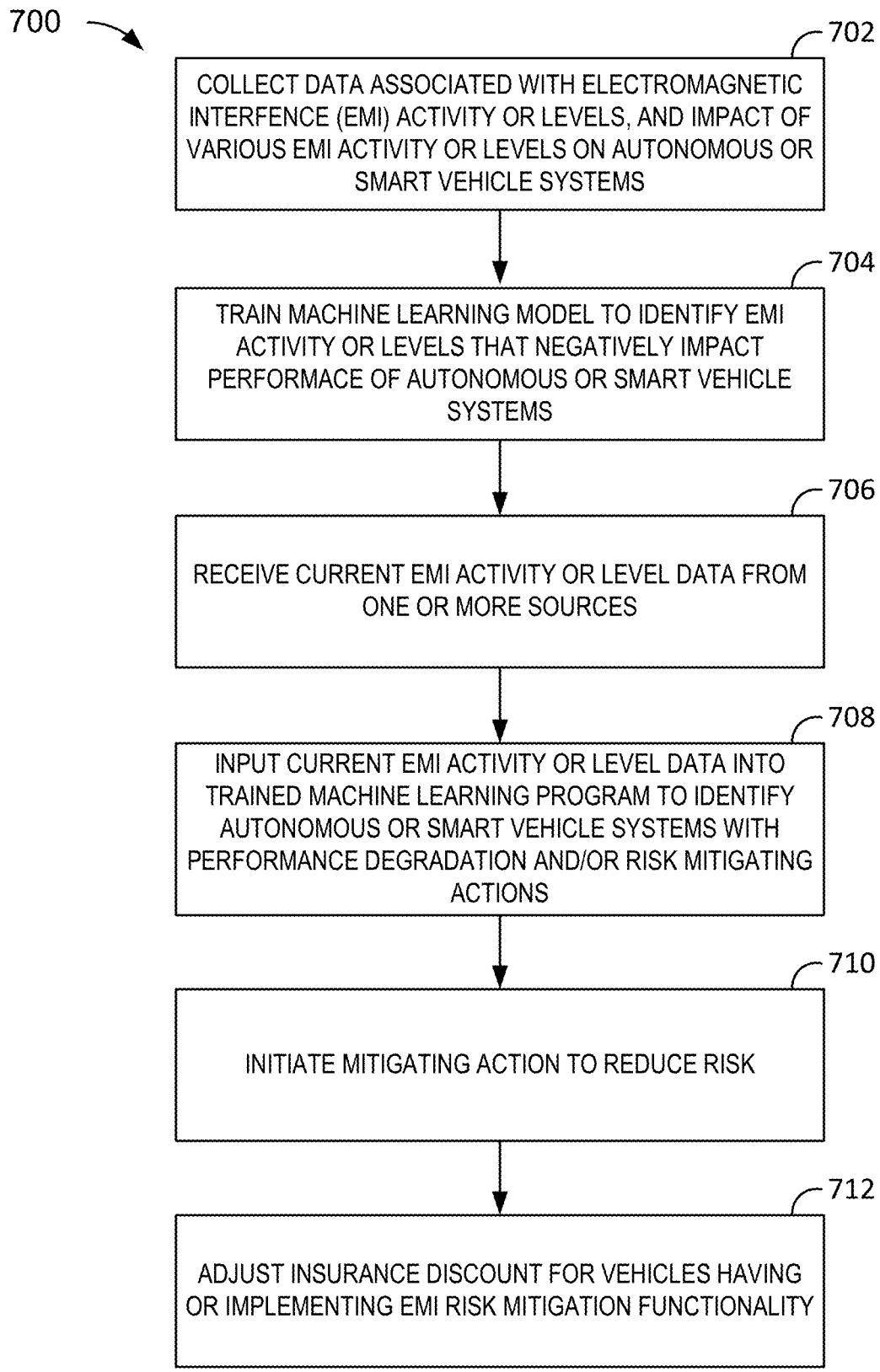
FIG. 7 illustrates another exemplary computer-implemented method of EMI risk mitigation.

FIG. 7 illustrates another exemplary computer-implemented method of EMI risk mitigation 700. The computer-implemented method 700 may include, via one or more processors, sensors, transceivers, or servers: (1) collecting data associated with EMI activity or level(s), and the impact of various EMI activity or level(s) on autonomous, smart, or other vehicle systems (including navigation systems) 702; (2) training a machine learning module, model, program, or algorithm to identify EMI activity or level(s) that negatively impact performance of autonomous, smart, or other vehicle systems 704; (3) receiving current EMI activity from one or more sources, such as via wireless communication or data transmission over one or more radio frequency links or communication channels 706; (4) inputting the current EMI activity or level data into the trained machine learning module or program to identify autonomous, smart, or other vehicle systems with performance degradation at current EMI, and/or identify one or more risk mitigation actions for each autonomous, smart, or other vehicle system at risk of poor performance 708; and/or (5) automatically initiating one or more risk mitigation actions to reduce risk 710.

In some embodiments, (1) collecting may include receiving historical data associated with EMI events affecting autonomous vehicles and associated EMI levels. In some embodiments, (3) receiving current EMI activity may include receiving current EMI data for a geographic region, and (4) inputting may include applying the current EMI data into the machine learning model to identify one or more autonomous vehicle systems with performance degradation based upon the current EMI data. The method 700 may further include (6) adjusting an insurance discount for vehicle having or implementing the EMI risk mitigation functionality 712. The risk mitigation actions may include generating warnings to vehicles or vehicle operators, disabling or limiting autonomous or semi-autonomous vehicle functionality until EMI activity subsides, causing the vehicle to pull over to the side of the road and park, moving or directing the vehicle to a safe parking spot, transferring vehicle control back over to a human passenger, or other risk mitigation actions, including those discussed elsewhere herein. The method may include additional, less, or alternate actions, including those discussed elsewhere herein.

Exemplary Embodiments & Functionality

In one aspect, a backup control computing device for reducing dangers to automation systems of autonomous vehicles may be provided. The backup control computing device includes a memory and a processor, wherein the processor is programmed to receive an indication of an anomalous event wherein the anomalous event may include one of a geomagnetic interference event and a cyber-attack event, perform a threat assessment for the anomalous event relative to an automation system of a vehicle wherein the automation system may be configured to control an aspect of autonomous operation of the vehicle, determine one or more mitigating actions to perform on the automation system based upon the threat assessment wherein the one or more mitigating actions may be configured to reduce a danger to the vehicle presented by the anomalous event, and perform the one or more mitigating actions on the automation system.

The backup control computing device referenced above may further include wherein performing the threat assessment for the anomalous event includes identifying the automation system from a plurality of automation systems based upon factors associated with the anomalous event. The backup control computing device referenced above may further include wherein performing the threat assessment for the anomalous event includes generating an event score for the anomalous event based upon one or more of a type of the anomalous event and a likelihood of the anomalous event impacting one or more of the vehicle the automation system. The backup control computing device referenced above may further include one or more sensors, wherein the anomalous event is a geomagnetic interference event, and wherein receiving an indication of an anomalous event includes detecting an anomalous event based upon data received from the one or more sensors. The backup control computing device referenced above may further include wherein the one or more sensors include a global positioning system (GPS) receiver, and wherein detecting an anomalous event further includes determining that communication to a particular GPS satellite has been lost. The backup control computing device referenced above may further include wherein the one or more mitigating actions includes causing an alert message to be presented to a driver of the vehicle.

The backup control computing device referenced above may further include wherein the one or more mitigating actions includes transitioning a piloting activity from the automation system to a driver of the vehicle. The backup control computing device referenced above may further include wherein the one or more mitigating actions includes disabling the automation system. The backup control computing device referenced above may further include wherein the one or more mitigating actions includes causing the vehicle to decelerate and park. The backup control computing device referenced above may further include wherein receiving an indication of an anomalous event includes receiving an alert message from a geomagnetic sensor service indicating the geomagnetic interference event, the geomagnetic interference event is caused by one of a solar flare and a corolla mass ejection. The backup control computing device referenced above may further include wherein the anomalous event is the cyber-attack event, wherein receiving the indication of the anomalous event includes receiving an indication of a cyber-attack having occurred on another vehicle. The backup control computing device referenced above may further include wherein receiving the indication of the anomalous event includes receiving the indication of the anomalous event from another vehicle via a vehicular wireless ad-hoc network.

In another aspect, a computer-implemented method for reducing dangers to automation systems of autonomous vehicles may be provided. The method may be implemented using a backup control computing device including a processor and a memory. The method, via one or more processors, sensors, servers, or transceivers, may include receiving an indication of an anomalous event wherein the anomalous event may include one of a geomagnetic interference event and a cyber-attack event, performing a threat assessment for the anomalous event relative to an automation system of a vehicle wherein the automation system may be configured to control one or more aspects of autonomous operation of the vehicle, determining one or more mitigating actions to perform on the automation system based upon the threat assessment wherein the one or more mitigating actions may be configured to reduce a danger to the vehicle presented by the anomalous event, and performing the one or more mitigating actions on the automation system.

The computer implemented method referenced above may further include wherein performing the threat assessment for the anomalous event includes identifying the automation system from a plurality of automation systems based upon one or more factors associated with the anomalous event. The computer implemented method referenced above may further include wherein performing the threat assessment for the anomalous event includes generating an event score for the anomalous event based upon one or more of a type of the anomalous event and a likelihood of the anomalous event impacting one or more of the vehicle the automation system. The computer implemented method referenced above may further include wherein the anomalous event is a geomagnetic interference event, wherein receiving an indication of an anomalous event includes detecting an anomalous event based upon data received from one or more sensors. The computer implemented method referenced above may further include wherein the one or more sensors include a global positioning system (GPS) receiver, and wherein detecting an anomalous event further includes determining that communication to a particular GPS satellite has been lost. The computer implemented method referenced above may further include wherein the one or more mitigating actions includes causing an alert message to be presented to a driver of the vehicle. The computer implemented method referenced above may further include wherein the one or more mitigating actions includes transitioning a piloting activity from the automation system to a driver of the vehicle. The computer implemented method referenced above may further include wherein the one or more mitigating actions includes disabling the automation system.

The computer implemented method referenced above may further include wherein the one or more mitigating actions includes causing the vehicle to decelerate and park. The computer implemented method referenced above may further include wherein receiving an indication of an anomalous event includes receiving an alert message from a geomagnetic sensor service indicating the geomagnetic interference event, the geomagnetic interference event is caused by one of a solar flare and a corolla mass ejection. The computer implemented method referenced above may further include wherein the anomalous event is the cyber-attack event, wherein receiving the indication of the anomalous event includes receiving an indication of a cyber-attack having occurred on another vehicle. The computer implemented method referenced above may further include wherein receiving the indication of the anomalous event includes receiving the indication of the anomalous event from another vehicle via a vehicular wireless ad-hoc network.

In another aspect, a non-transitory computer-readable medium storing instructions may be provided. When executed by a processor of a computing device, the instructions may cause the processor of a backup control computing device to perform operations including determining the occurrence of an anomalous event wherein the anomalous event may include one of a geomagnetic interference event and a cyber-attack event, performing a threat assessment for the anomalous event relative to an automation system of a vehicle wherein the automation system may be configured to control an aspect of autonomous operation of the vehicle, determining one or more mitigating actions to perform on the automation system based upon the threat assessment wherein the one or more mitigating actions being configured to reduce a danger to the vehicle presented by the anomalous event, and performing the one or more mitigating actions on the automation system.

In yet another aspect, a computer-implemented method of electromagnetic interference (EMI) risk mitigation may be provided. The computer-implemented method, via one or more processors, sensors, transceivers, and/or servers, may include detecting a current EMI level for a geographic location, comparing the current EMI levels with baseline EMI data, identifying one or more vehicle systems at risk of performance degradation based upon the geographic location and the comparing, determining one or more risk mitigation actions for each identified vehicle system, and initiating the one or more risk mitigation actions on each identified vehicle system to reduce the risk of vehicle collision or accident.

The method of EMI risk mitigation referenced above may further include adjusting an insurance discount for drivers having vehicles that are configured to initiate the one or more risk mitigation actions. The method of EMI risk mitigation referenced above may further include wherein the risk mitigation actions include one or more of (i) generating a visual alert to an operator of the vehicle, (ii) restricting operation of an aspect of autonomous operation until EMI activity subsides, (iii) causing the vehicle to park, (iv) moving the vehicle to a safe parking spot, and (v) transferring vehicle control to a human passenger.

In still another aspect, a computer system configured to mitigate electromagnetic interference (EMI) risk to vehicles may be provided. The computer system may include one or more processors, sensors, transceivers, and/or servers configured to detect a current EMI level for a geographic location, compare the current EMI levels with baseline EMI data, identify one or more vehicle systems at risk of performance degradation based upon the geographic location and the comparing, determine one or more risk mitigation actions for each identified vehicle system, and initiate the one or more risk mitigation actions on each identified vehicle system to reduce the risk of vehicle collision or accident.

The computer system referenced above may be further configured to adjust an insurance discount for drivers having vehicles that are configured to initiate the one or more risk mitigation actions. The computer system referenced above may further include wherein the risk mitigation actions may include one or more of (i) generating a visual alert to an operator of the vehicle, (ii) restricting operation of an aspect of autonomous operation until EMI activity subsides, (iii) causing the vehicle to park, (iv) moving the vehicle to a safe parking spot, and (v) transferring vehicle control to a human passenger.

In another aspect, a computer-implemented method of mitigating risk from electromagnetic interference (EMI) may be provided. The computer-implemented method, via one or more processors, sensors, transceivers, or servers, may include receiving historical data associated with EMI events affecting autonomous vehicles and associated EMI levels, training, with the historical data, a machine learning model to identify EMI levels that negatively impact performance of autonomous vehicle systems, receiving current EMI data for a geographic region, applying the current EMI data into the machine learning model to identify one or more autonomous vehicle systems with performance degradation based upon the current EMI data, identifying one or more risk mitigation actions for each identified autonomous vehicle, and automatically initiating the one or more risk mitigation actions to reduce risk from EMI.

The method referenced above may further include adjusting an insurance discount for drivers having vehicles that are configured to initiate the one or more risk mitigation actions. The method referenced above may further include wherein the risk mitigation actions may include one or more of (i) generating a visual alert to an operator of the vehicle, (ii) restricting operation of an aspect of autonomous operation until EMI activity subsides, (iii) causing the vehicle to park, (iv) moving the vehicle to a safe parking spot, and (v) transferring vehicle control to a human passenger.

In another aspect, a computer system configured for EMI risk mitigation may be provided. The computer system includes one or more processors, sensors, transceivers, or servers configured to receive historical data associated with EMI events affecting autonomous vehicles and associated EMI levels, train, with the historical data, a machine learning model to identify EMI levels that negatively impact performance of autonomous vehicle systems, receive current EMI data for a geographic region, apply the current EMI data into the machine learning model to identify one or more autonomous vehicle systems with performance degradation based upon the current EMI data, identify one or more risk mitigation actions for each identified autonomous vehicle, and automatically initiate the one or more risk mitigation actions to reduce risk from EMI.

The computer system referenced above may be further configured to adjust an insurance discount for drivers having vehicles that are configured to initiate the one or more risk mitigation actions. The computer system referenced above may further include wherein the risk mitigation actions may include one or more of (i) generating a visual alert to an operator of the vehicle, (ii) restricting operation of an aspect of autonomous operation until EMI activity subsides, (iii)

causing the vehicle to park, (iv) moving the vehicle to a safe parking spot, and (v) transferring vehicle control to a human passenger.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a reinforced or combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs.

Additionally or alternatively, the machine learning programs may be trained by inputting sample data sets or certain data into the programs, such as drone, autonomous or semi-autonomous drone, image, mobile device, smart or autonomous vehicle, and/or intelligent home, building, and/or real property telematics data. The machine learning programs may utilize deep learning, combined learning, and/or reinforced learning algorithms or modules that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and/or unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ADDITIONAL CONSIDERATIONS

With the foregoing, an insurance customer (e.g., a driver or vehicle owner) may opt-in to a rewards, insurance discount, or other type of program. After the insurance customer provides their affirmative consent, an insurance provider remote server may collect data from the customer's mobile device, smart vehicle, autonomous or semi-autonomous vehicle, smart home controller, or other smart devices—such as with the customer's permission or affirmative consent. The data collected may be related to smart or autonomous vehicle functionality, smart home functionality (or home occupant preferences or preference profiles), and/or insured assets before (and/or after) an insurance-related event, including those events discussed elsewhere herein. In return, those insured may receive discounts or insurance cost savings related to auto, home, renters, personal articles, mobile, and other types of insurance from the insurance provider.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A non-transitory computer-readable medium storing instructions that, when executed by a processor of a computing device, cause the processor of a backup control computing device to perform operations comprising:
   determining an anomalous event has occurred, the anomalous event including one of a geomagnetic interference event and a cyber-attack event;
   determining an automation system of a plurality of automation systems of a vehicle impacted by the anomalous event;
   performing a threat assessment for the anomalous event relative to the automation system of the vehicle, the automation system being configured to control an aspect of autonomous operation of the vehicle, wherein performing the threat assessment includes determining a severity level of a plurality of predefined severity levels and each severity level of the plurality of predefined severity levels is associated with at least one different mitigating action;
   determining one or more mitigating actions to perform based upon the threat assessment, the one or more mitigating actions being configured to reduce a danger to the vehicle presented by the anomalous event; and
   performing at least one of the one or more mitigating actions on the automation system, thereby reducing danger to the vehicle presented by the anomalous event.

2. A backup control server for reducing dangers to automation systems of autonomous vehicles, the backup control server comprising a memory and a processor, wherein the processor is programmed to:
   detect an anomalous event, the anomalous event including one of a geomagnetic interference event and a cyber-attack event;
   determine an automation system of a plurality of automation systems of a vehicle impacted by the anomalous event;
   perform a threat assessment for the anomalous event relative to the automation system of the vehicle, the automation system configured to control an aspect of autonomous operation of the vehicle, wherein performing the threat assessment includes determining a severity level of a plurality of predefined severity levels and each severity level of the plurality of predefined severity levels is associated with at least one different mitigating action;
   determine one or more mitigating actions to perform based upon the threat assessment, the one or more mitigating actions configured to reduce a danger to the vehicle presented by the anomalous event; and
   cause the vehicle to perform at least one of the one or more mitigating actions on the automation system by transmitting instructions to the vehicle, thereby reducing danger to the vehicle presented by the anomalous event.

3. The backup control server of claim 2, wherein performing the threat assessment for the anomalous event includes identifying the automation system based upon factors associated with the anomalous event.

4. The backup control server of claim 3, wherein the factors comprise at least one of an impact level of the anomalous event or a difficulty level associated with removing malware associated with the anomalous event.

5. The backup control server of claim 2, wherein performing the threat assessment for the anomalous event includes generating an event score for the anomalous event based upon one or more of a type of the anomalous event and a likelihood of the anomalous event impacting one or more of the vehicle the automation system.

6. The backup control server of claim 2, wherein the anomalous event is a geomagnetic interference event, wherein receiving an indication of an anomalous event includes detecting an anomalous event based upon data received from one or more sensors.

7. The backup control server of claim 6, wherein the one or more sensors include a global positioning system (GPS) receiver, wherein detecting an anomalous event further includes determining that communication to a particular GPS satellite has been lost.

8. The backup control server of claim 6, wherein performing the threat assessment for the anomalous event includes identifying the automation system from a plurality of automation systems based upon factors associated with the anomalous event, wherein the factors comprise at least one of a type of geomagnetic interference event, an estimated strength of the anomalous event, or an estimated geographical region of effect of the anomalous event.

9. The backup control server of claim 2, wherein the one or more mitigating actions includes causing an alert message to be presented to a driver of the vehicle.

10. The backup control server of claim 2, wherein the one or more mitigating actions includes transitioning a piloting activity from the automation system to a driver of the vehicle.

11. The backup control server of claim 2, wherein the one or more mitigating actions includes disabling the automation system.

12. The backup control server of claim 2, wherein the one or more mitigating actions includes causing the vehicle to decelerate and park.

13. The backup control server of claim 2, wherein receiving an indication of an anomalous event includes receiving an alert message from a geomagnetic sensor service indicating the geomagnetic interference event, the geomagnetic interference event is caused by one of a solar flare and a coronal mass ejection.

14. The backup control server of claim 2, wherein the anomalous event is the cyber-attack event, wherein determining the anomalous event has occurred includes receiving an indication of a cyber-attack having occurred on another vehicle.

15. The backup control server of claim 2, wherein determining the anomalous event has occurred includes receiving an indication of the anomalous event from another vehicle via a vehicular wireless ad-hoc network.

16. The backup control server of claim 2, wherein the plurality of predefined severity levels comprises a low severity level, a medium severity level, a high severity level, and an emergency severity level.

17. The backup control server of claim 16, wherein the medium severity level is associated with a mitigating action of alerting a driver of the vehicle of the anomalous event, the high severity level is associated with a mitigating action of shutting down the automation system, and the emergency severity level is associated with a mitigating action of immediately slowing down and parking the vehicle.

18. A backup control computing device for reducing dangers to automation systems of autonomous vehicles, the backup control computing device comprising a memory and a processor, wherein the processor is programmed to:
determine the occurrence of an anomalous event, the anomalous event including one of a geomagnetic interference event and a cyber-attack event;
determine an automation system of a plurality of automation systems of a vehicle impacted by the anomalous event;
perform a threat assessment for the anomalous event relative to the automation system of the vehicle, the automation system configured to control an aspect of autonomous operation of the vehicle, wherein performing the threat assessment includes determining a severity level of a plurality of predefined severity levels and each severity level of the plurality of predefined severity levels is associated with at least one different mitigating action;
determine one or more mitigating actions to perform based upon the threat assessment, wherein the one or more mitigating actions are configured to reduce a danger to the vehicle presented by the anomalous event; and
perform the at least one of the one or more mitigating actions on the automation system, thereby reducing danger to the vehicle presented by the anomalous event.

19. A computer-implemented method for reducing dangers to automation systems of autonomous vehicles, the method implemented using a backup control computing device including a processor and a memory, the method comprising, via one or more processors, sensors, servers, or transceivers:
determining the occurrence of an anomalous event, the anomalous event including one of a geomagnetic interference event and a cyber-attack event;
determining an automation system of a plurality of automation systems of a vehicle impacted by the anomalous event;
performing a threat assessment for the anomalous event relative to the automation system of the vehicle, the automation system being configured to control an aspect of autonomous operation of the vehicle, wherein performing the threat assessment includes determining a severity level of a plurality of predefined severity levels and each severity level of the plurality of predefined severity levels is associated with at least one different mitigating action;
determining one or more mitigating actions to perform based upon the threat assessment, the one or more mitigating actions being configured to reduce a danger to the vehicle presented by the anomalous event; and
performing the at least one of the one or more mitigating actions on the automation system, thereby reducing danger to the vehicle presented by the anomalous event.

* * * * *